(12) United States Patent
Ishii et al.

(10) Patent No.: US 11,873,363 B2
(45) Date of Patent: Jan. 16, 2024

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Hidetake Ishii, Tokyo (JP); Norikazu Yamamoto, Tokyo (JP); Yusaku Matsuo, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 157 days.

(21) Appl. No.: 16/642,899

(22) PCT Filed: Jul. 5, 2018

(86) PCT No.: PCT/JP2018/025456
§ 371 (c)(1),
(2) Date: Feb. 28, 2020

(87) PCT Pub. No.: WO2019/044166
PCT Pub. Date: Mar. 7, 2019

(65) Prior Publication Data
US 2020/0255574 A1  Aug. 13, 2020

(30) Foreign Application Priority Data

Aug. 30, 2017  (JP) .................................. 2017-165723

(51) Int. Cl.
| | | |
|---|---|---|
| *H01M 4/00* | (2006.01) | |
| *C08F 297/04* | (2006.01) | |
| *H01M 4/62* | (2006.01) | |
| *H01M 4/133* | (2010.01) | |
| *H01M 10/0525* | (2010.01) | |

(52) U.S. Cl.
CPC ........... C08F 297/046 (2013.01); H01M 4/62 (2013.01); H01M 4/622 (2013.01); H01M 4/133 (2013.01); H01M 10/0525 (2013.01)

(58) Field of Classification Search
CPC ..... C08F 297/046; H01M 4/622; H01M 4/13; H01M 4/133; H01M 4/134; H01M 10/0525; H01M 4/139; H01M 4/62; H01M 10/0566; H01M 10/052; Y02E 60/10
See application file for complete search history.

(56) References Cited

U.S. PATENT DOCUMENTS

| | | | | | |
|---|---|---|---|---|---|
| 5,164,455 | A | * | 11/1992 | Agostinis | ............... C08L 53/025 525/271 |
| 5,589,542 | A | * | 12/1996 | Himes | ................. C08F 297/044 525/98 |
| 9,193,893 | B2 | | 11/2015 | Oda et al. | |
| 2012/0136114 | A1 | * | 5/2012 | Nishikawa | ................ C08F 8/04 524/575 |
| 2013/0316235 | A1 | * | 11/2013 | Yasuda | ............... H01M 4/0404 429/211 |
| 2013/0330622 | A1 | | 12/2013 | Sasaki | |
| 2014/0248534 | A1 | * | 9/2014 | Chikugo | ............... H01M 4/622 429/212 |
| 2014/0350164 | A1 | * | 11/2014 | Oda | ....................... C08L 53/02 524/505 |
| 2017/0250389 | A1 | * | 8/2017 | Toyoda | ............... H01M 50/414 |
| 2019/0044147 | A1 | | 2/2019 | Yamamoto | |

FOREIGN PATENT DOCUMENTS

| | | |
|---|---|---|
| CN | 103998555 A | 8/2014 |
| EP | 3675255 A1 | 7/2020 |
| EP | 3706216 A1 | 9/2020 |
| EP | 3719893 A1 | 10/2020 |
| EP | 3764431 A1 | 1/2021 |
| JP | 2000285924 A | 10/2000 |
| JP | 2007317412 A * | 12/2007 |
| JP | 2012204303 A | 10/2012 |
| JP | 2014011019 A * | 1/2014 |
| WO | 2012115096 A1 | 8/2012 |
| WO | 2017056404 A1 | 4/2017 |

OTHER PUBLICATIONS

Machine translation of JP 2014011019 A, obtained Sep. 10, 2021 (Year: 2014).*

Mar. 3, 2020, International Preliminary Report on Patentability issued in the International Patent Application No. PCT/JP2018/025456.

Apr. 29, 2021, the Extended European Search Report issued by the European Patent Office in the corresponding European Patent Application No. 18852545.5.

* cited by examiner

*Primary Examiner* — Nicholas P D'Aniello
(74) *Attorney, Agent, or Firm* — KENJA IP LAW PC

(57) ABSTRACT

Provided is a binder composition for a non-aqueous secondary battery electrode capable of forming an electrode for a non-aqueous secondary battery that can cause a non-aqueous secondary battery to display excellent low-temperature cycle characteristics and low-temperature output characteristics. The binder composition for a non-aqueous secondary battery electrode contains a polymer and a solvent. The polymer is a block copolymer including an aromatic vinyl monomer unit and an aliphatic conjugated diene monomer unit having a carbon number of 5 or more. The amount of the polymer that elutes into electrolyte solution is not less than 1 mass % and not more than 20 mass %.

9 Claims, No Drawings

_(1)_

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. Consequently, in recent years, studies have been made to improve electrodes and other battery components with the aim of achieving even higher non-aqueous secondary battery performance.

An electrode for a secondary battery, such as a lithium ion secondary battery, generally includes a current collector and an electrode mixed material layer formed on the current collector. The electrode mixed material layer is formed, for example, by applying, onto the current collector, a slurry composition in which an electrode active material, a binder-containing binder composition, and so forth are dispersed in a dispersion medium (solvent), and drying the applied slurry composition.

In recent years, there have been attempts to improve binder compositions used in the formation of electrode mixed material layers in order to further improve secondary battery performance. In one specific example, it has been proposed that binding capacity among components of an electrode mixed material layer, such as an electrode active material, and binding capacity between the electrode mixed material layer and a current collector (i.e., peel strength) can be increased, and secondary battery performance can be improved through use of a binder composition that contains two types of particulate polymers of differing particle diameters as a binder.

More specifically, Patent Literature (PTL) 1, for example, proposes that the peel strength of an electrode can be increased and the performance (particularly high-temperature cycle characteristics) of a secondary battery can be improved by using a binder composition that contains a particulate polymer A having a volume-average particle diameter of not less than 0.6 μm and not more than 2.5 μm and a particulate polymer B having a volume-average particle diameter of not less than 0.01 μm and not more than 0.5 μm, and in which the content of the particulate polymer A is more than 30 mass % and not more than 90 mass % of the total content of the particulate polymer A and the particulate polymer B.

CITATION LIST

Patent Literature

PTL 1: WO 2017/056404 A1

SUMMARY

Technical Problem

However, there has been demand for further improvement of secondary battery performance in recent years, and there is also room for improvement over the conventional binder composition described above in terms of further improving battery characteristics (for example, low-temperature cycle characteristics and low-temperature output characteristics) of a non-aqueous secondary battery that includes an electrode produced using the binder composition.

Accordingly, one objective of the present disclosure is to provide a binder composition for a non-aqueous secondary battery electrode and a slurry composition for a non-aqueous secondary battery electrode that are capable of forming an electrode for a non-aqueous secondary battery that can cause a non-aqueous secondary battery to display excellent low-temperature cycle characteristics and low-temperature output characteristics.

Another objective of the present disclosure is to provide an electrode for a non-aqueous secondary battery that can cause a non-aqueous secondary battery to display excellent low-temperature cycle characteristics and low-temperature output characteristics.

Yet another objective of the present disclosure is to provide a non-aqueous secondary battery having excellent battery characteristics such as low-temperature cycle characteristics and low-temperature output characteristics.

Solution to Problem

The inventors conducted diligent investigation with the aim of solving the problem set forth above. The inventors discovered that a secondary battery having excellent battery characteristics such as low-temperature cycle characteristics and low-temperature output characteristics can be obtained by using a binder composition containing a solvent and a polymer that is a block copolymer including an aromatic vinyl monomer unit and a specific aliphatic conjugated diene monomer unit, and for which the amount of the polymer that elutes into electrolyte solution is a specific amount. The inventors completed the present disclosure based on this finding.

Specifically, the present disclosure aims to advantageously solve the problem set forth above by disclosing a binder composition for a non-aqueous secondary battery electrode comprising a polymer and a solvent, wherein the polymer is a block copolymer including an aromatic vinyl monomer unit and an aliphatic conjugated diene monomer unit having a carbon number of 5 or more, and an amount of the polymer that elutes into electrolyte solution is not less than 1 mass % and not more than 20 mass %.

When a binder composition contains a solvent and a polymer that is a block copolymer including an aromatic vinyl monomer unit and an aliphatic conjugated diene monomer unit having a carbon number of 5 or more, and when the amount of the polymer that elutes into electrolyte solution is within the range set forth above in this manner, it is possible to improve battery characteristics such as low-temperature cycle characteristics and low-temperature output characteristics of a secondary battery including an electrode formed using a slurry composition that contains the binder composition and an electrode active material.

In the presently disclosed binder composition for a non-aqueous secondary battery electrode, the polymer preferably includes a structure derived from a coupling agent. When the polymer includes a structure derived from a coupling agent, it is possible to further enhance battery characteristics such as low-temperature cycle characteristics and low-temperature output characteristics of a secondary battery including an electrode formed using the binder composition.

In the present disclosure, it can be measured that "a polymer includes a structure derived from a coupling agent" by gel permeation chromatography (GPC).

In the presently disclosed binder composition for a non-aqueous secondary battery electrode, the polymer preferably has a coupling ratio of not less than 20 mass % and not more than 90 mass %. When the coupling ratio of the polymer is not less than 20 mass % and not more than 90 mass %, it is possible to further enhance battery characteristics such as low-temperature cycle characteristics and low-temperature output characteristics of a secondary battery including an electrode formed using the binder composition.

The "coupling ratio" referred to in the present disclosure is the ratio in which polymer bonded through the action of a coupling agent as a bonding reaction agent (i.e., polymer that has undergone a reaction through the coupling agent) is present.

The coupling ratio of a polymer can be measured by gel permeation chromatography (GPC).

Specifically, the coupling ratio is calculated by the following equation (1) based on the area (S0) of all peaks for the polymer and the area (51) of a peak corresponding to a portion that does not include a structure derived from a coupling agent in measurement by gel permeation chromatography.

$$\text{Coupling ratio (\%)}=(S0-S1)\times 100/S0 \qquad \text{Equation (1)}$$

The coupling agent preferably has a functionality of not lower than 2 and not higher than 6. When the coupling agent has a functionality of not lower than 2 and not higher than 6, it is possible to further enhance battery characteristics such as low-temperature cycle characteristics and low-temperature output characteristics of a secondary battery including an electrode formed using the binder composition.

In the presently disclosed binder composition for a non-aqueous secondary battery electrode, the polymer preferably includes the aromatic vinyl monomer unit in a proportion of not less than 16 mass % and not more than 30 mass %. When the polymer includes the aromatic vinyl monomer unit in the proportion set forth above, it is possible to further enhance battery characteristics such as low-temperature cycle characteristics and low-temperature output characteristics of a secondary battery including an electrode formed using the binder composition.

The "fractional content of an aromatic vinyl monomer unit" and the "fractional content of an aliphatic conjugated diene monomer unit" referred to in the present disclosure can be measured by a nuclear magnetic resonance (NMR) method such as $^1$H-NMR.

The present disclosure also aims to advantageously solve the problem set forth above by disclosing a slurry composition for a non-aqueous secondary battery electrode comprising an electrode active material and any one of the binder compositions for a non-aqueous secondary battery electrode set forth above. Through inclusion of an electrode active material and the binder composition set forth above in this manner, it is possible to obtain an electrode with which a secondary battery having excellent battery characteristics such as low-temperature cycle characteristics and low-temperature output characteristics can be produced.

The present disclosure also aims to advantageously solve the problem set forth above by disclosing an electrode for a non-aqueous secondary battery comprising an electrode mixed material layer formed using the slurry composition for a non-aqueous secondary battery electrode set forth above. Through use of a slurry composition that contains an electrode active material and any one of the binder compositions set forth above in this manner, an electrode for a non-aqueous secondary battery is obtained that can cause a non-aqueous secondary battery to display excellent battery characteristics such as low-temperature cycle characteristics and low-temperature output characteristics.

The present disclosure also aims to advantageously solve the problem set forth above by disclosing a non-aqueous secondary battery comprising a positive electrode, a negative electrode, an electrolyte solution, and a separator, wherein at least one of the positive electrode and the negative electrode is the electrode for a non-aqueous secondary battery set forth above. By using the electrode for a non-aqueous secondary battery set forth above as at least one of the positive electrode and the negative electrode in this manner, it is possible to obtain a non-aqueous secondary battery having excellent battery characteristics such as low-temperature cycle characteristics and low-temperature output characteristics.

Advantageous Effect

According to the present disclosure, it is possible to provide a binder composition for a non-aqueous secondary battery electrode and a slurry composition for a non-aqueous secondary battery electrode that are capable of forming an electrode for a non-aqueous secondary battery that can cause a non-aqueous secondary battery to display excellent low-temperature cycle characteristics and low-temperature output characteristics.

Moreover, according to the present disclosure it is possible to provide an electrode for a non-aqueous secondary battery that can cause a non-aqueous secondary battery to display excellent low-temperature cycle characteristics and low-temperature output characteristics.

Furthermore, according to the present disclosure, it is possible to provide a non-aqueous secondary battery having excellent battery characteristics such as low-temperature cycle characteristics and low-temperature output characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode produced using the presently disclosed binder composition for a non-aqueous secondary battery electrode can be used in formation of an electrode of a non-aqueous secondary battery such as a lithium ion secondary battery (i.e., an electrode for a non-aqueous secondary battery). Furthermore, the presently disclosed non-aqueous secondary battery includes an electrode for a non-aqueous secondary battery formed using the presently disclosed slurry composition for a non-aqueous secondary battery electrode.

Note that the presently disclosed binder composition for a non-aqueous secondary battery electrode and slurry composition for a non-aqueous secondary battery electrode are particularly suitable for use in formation of a negative electrode of a non-aqueous secondary battery.

(Binder Composition for Non-Aqueous Secondary Battery Electrode)

The presently disclosed binder composition for a non-aqueous secondary battery electrode contains a polymer and a solvent, and optionally contains other components that can be contained in electrodes of secondary batteries. The polymer of the presently disclosed binder composition for a non-aqueous secondary battery electrode is a block copolymer including an aromatic vinyl monomer unit and an aliphatic conjugated diene monomer unit having a carbon number of 5 or more. Moreover, the amount of the polymer of the presently disclosed binder composition for a non-aqueous secondary battery electrode that elutes into electrolyte solution is not less than 1 mass % and not more than 20 mass %.

The presently disclosed binder composition for a non-aqueous secondary battery electrode can improve battery characteristics such as low-temperature cycle characteristics and low-temperature output characteristics of a secondary battery including an electrode formed using a slurry composition that contains the binder composition and an electrode active material as a result of the presently disclosed binder composition for a non-aqueous secondary battery electrode containing a solvent and a polymer that is a block copolymer including an aromatic vinyl monomer unit and an aliphatic conjugated diene monomer unit having a carbon number of 5 or more and as a result of the amount of the polymer that elutes into electrolyte solution being within the range set forth above.

The volume-average particle diameter of the binder composition for a non-aqueous secondary battery electrode after phase-inversion emulsification is preferably 2.1 μm or more, and more preferably 2.3 μm or more, and is preferably 2.4 μm or less.

<Polymer>

In an electrode produced by forming an electrode mixed material layer using a slurry composition for a non-aqueous secondary battery electrode that is produced using the binder composition, the polymer holds components contained in the electrode mixed material layer to prevent these components detaching from the electrode mixed material layer (i.e., the polymer functions as a binder).

[Properties of Polymer]

As a result of the polymer used in the presently disclosed binder composition being a block copolymer including an aromatic vinyl monomer unit and an aliphatic conjugated diene monomer unit having a carbon number of 5 or more and as a result of the amount of the polymer that elutes into electrolyte solution being not less than 1 mass % and not more than 20 mass %, it is possible to form an electrode that can cause a secondary battery to display good battery characteristics such as low-temperature cycle characteristics and low-temperature output characteristics.

[Chemical Composition of Polymer]

The polymer is a block copolymer that includes an aromatic vinyl monomer unit and an aliphatic conjugated diene monomer unit having a carbon number of 5 or more. However, it should be noted that the polymer can include monomer units other than the aromatic vinyl monomer unit and the aliphatic conjugated diene monomer unit having a carbon number of 5 or more (hereinafter, also referred to as "other monomer units").

[[Aromatic Vinyl Monomer Unit]]

Examples of aromatic vinyl monomers that can form the aromatic vinyl monomer unit include, but are not specifically limited to, styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable.

—Fractional Content of Aromatic Vinyl Monomer Unit—

The proportion constituted by the aromatic vinyl monomer unit in the polymer when the amount of all monomer units in the polymer is taken to be 100 mass % is preferably 16 mass % or more, more preferably 17 mass % or more, particularly preferably 18 mass % or more, and most preferably 19 mass % or more, and is preferably 30 mass % or less, more preferably 29 mass % or less, and particularly preferably 24 mass % or less. One reason for this is that the amount of the polymer that elutes into electrolyte solution can be prevented from becoming too large and low-temperature output characteristics of a secondary battery including an electrode formed using the binder composition can be further improved when the fractional content of the aromatic vinyl monomer unit is not more than any of the upper limits set forth above. Another reason is that the amount of the polymer that elutes into electrolyte solution can be prevented from becoming too small and low-temperature cycle characteristics of a secondary battery including the aforementioned electrode can be further improved when the fractional content of the aromatic vinyl monomer unit is not less than any of the lower limits set forth above.

[[Aliphatic Conjugated Diene Monomer Unit Having Carbon Number of 5 or More]]

Examples of aliphatic conjugated diene monomers that can form the aliphatic conjugated diene monomer unit having a carbon number of 5 or more include, but are not specifically limited to, 2-methyl-1,3-butadiene (isoprene), 2,3-dimethyl-1,3-butadiene, 2-ethyl-1,3-butadiene, and 1,3-pentadiene. Of these aliphatic conjugated diene monomers, isoprene is preferable. One aliphatic conjugated diene monomer may be used individually, or two or more aliphatic conjugated diene monomers may be used in combination in a freely selected ratio.

—Fractional Content of Aliphatic Conjugated Diene Monomer Unit Having Carbon Number of 5 or More—

The proportion constituted by the aliphatic conjugated diene monomer unit having a carbon number of 5 or more in the polymer when the amount of all monomer units in the polymer is taken to be 100 mass % is preferably 70 mass % or more, and more preferably 71 mass % or more, and is preferably 84 mass % or less, more preferably 83 mass % or less, and particularly preferably 82 mass % or less. One reason for this is that the amount of the polymer that elutes into electrolyte solution can be prevented from becoming too large and low-temperature output characteristics of a secondary battery including an electrode formed using the binder composition can be further improved when the fractional content of the aliphatic conjugated diene monomer unit is not less than any of the lower limits set forth above. Another reason is that the amount of the polymer that elutes into electrolyte solution can be prevented from becoming too small and low-temperature cycle characteristics of a secondary battery including the aforementioned electrode can be further improved when the fractional content of the aliphatic conjugated diene monomer unit is not more than any of the upper limits set forth above.

[[Other Monomer Units]]

Examples of monomer units other than the above-described aromatic vinyl monomer unit and aliphatic conjugated diene monomer unit that may be included in the polymer include, but are not specifically limited to, repeating units derived from known monomers that are copolymerizable with aromatic vinyl monomers and aliphatic conjugated diene monomers such as described above. Specific examples of other monomer units include, but are not specifically limited to, a (meth)acrylic acid ester monomer unit and a hydrophilic group-containing monomer unit.

One of such monomers may be used individually, or two or more of such monomers may be used in combination. Note that in the present disclosure, "(meth)acryl" is used to indicate "acryl" and/or "methacryl".

Examples of (meth)acrylic acid ester monomers that can form the (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

Examples of hydrophilic group-containing monomers that can form the hydrophilic group-containing monomer unit include polymerizable monomers that include a hydrophilic group. Specific examples of hydrophilic group-containing monomers include carboxy group-containing monomers, sulfo group-containing monomers, phosphate group-containing monomers, and hydroxy group-containing monomers.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1—COO—(C_qH_{2q}O)_p—H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

[Block Copolymer]

The polymer is required to be a block copolymer. Electrode peel strength can be achieved and secondary battery rate characteristics and the like can be achieved as a result of the polymer being a block copolymer.

The block copolymer constituting the polymer includes the previously described aromatic vinyl monomer unit and aliphatic conjugated diene monomer unit. In other words, the block polymer includes a block region formed by the aromatic vinyl monomer unit and a block region formed by the aliphatic conjugated diene monomer unit. As a result of the block copolymer including a block region formed by the aromatic vinyl monomer unit and a block region formed by the aliphatic conjugated diene monomer unit, electrode peel strength and secondary battery rate characteristics, etc., can be achieved through the effects of these block regions.

It should be noted that the block copolymer may further include a block region formed by another monomer unit or a random region. Monomers that can form the monomer units of the block copolymer and the preferred fractional content of each monomer unit are as previously described.

The structure of the block copolymer constituting the polymer may be any structure such as a diblock structure including one each of two types of block regions (for example, a structure formed by a block region formed by an aliphatic conjugated diene monomer unit and a block region formed by an aromatic vinyl monomer unit) or a triblock structure formed by three block regions (for example, a structure formed by a block region formed by an aromatic vinyl monomer unit, a block region formed by an aliphatic conjugated diene monomer unit, and a block region formed by an aromatic vinyl monomer unit). Examples of triblock structures include (i) a "symmetric triblock structure" obtained by using a coupling agent to bond a "block region formed by an aliphatic conjugated diene monomer unit" of a diblock structure (structure formed by a block region formed by an aliphatic conjugated diene monomer unit and a block region formed by an aromatic vinyl monomer unit) to a "block region formed by an aliphatic conjugated diene monomer unit" of another such diblock structure to obtain a structure in which a block region formed by an aromatic vinyl monomer unit, a block region formed by an aliphatic conjugated diene monomer unit (structure region including a block section formed by an aliphatic conjugated diene monomer, a structure derived from a coupling agent, and a block section formed by an aliphatic conjugated diene monomer), and a block region formed by an aromatic vinyl monomer unit are bonded, and (ii) an "asymmetric triblock structure" obtained by copolymerizing an aromatic vinyl monomer, an aliphatic conjugated diene monomer, and an aromatic vinyl monomer in order without using a coupling agent. Accordingly, the "symmetric triblock structure" includes a structure derived from a subsequently described coupling agent in a block region formed by an aliphatic conjugated diene monomer unit, whereas the "asymmetric triblock structure" does not include a structure derived from a subsequently described coupling agent.

[[Fractional Content of Copolymer Having Diblock Structure]]

The proportion constituted by copolymer having a diblock structure among the entire polymer (i.e., the diblock content) is preferably 5 mass % or more, more preferably 10 mass % or more, and particularly preferably 18 mass % or more, and is preferably 70 mass % or less, more preferably 66 mass % or less, even more preferably 60 mass % or less, further preferably 45 mass % or less, particularly preferably 23 mass % or less, and most preferably 20 mass % or less. One reason for this is that the amount of the polymer that elutes into electrolyte solution can be prevented from becoming too small and flexibility (pressability) of an electrode formed using the binder composition can be improved when the fractional content of copolymer having a diblock structure is not less than any of the lower limits set forth above. Another reason is that the amount of the polymer that elutes into electrolyte solution can be prevented from becoming too large and low-temperature output characteristics of a secondary battery including an electrode formed using the binder composition can be further improved when the fractional content of copolymer having a diblock structure is not more than any of the upper limits set forth above.

Note that the diblock content can be measured from the area ratio of peaks obtained by high-performance liquid chromatography (standard polystyrene-equivalent values) that correspond to various block copolymers.

Moreover, the diblock content can be adjusted by altering the type of a subsequently described coupling agent, the reaction conditions, and so forth.

[[Fractional Content of Copolymer Having Symmetric Triblock Structure]]

The proportion constituted by copolymer having a symmetric triblock structure among the entire polymer (i.e., the symmetric triblock content) is preferably 30 mass % or more, more preferably 34 mass % or more, even more preferably 40 mass % or more, further preferably 55 mass % or more, particularly preferably 77 mass % or more, and most preferably 80 mass % or more, and is preferably 90 mass % or less, more preferably 88 mass % or less, and particularly preferably 82 mass % or less. One reason for this is that the amount of the polymer that elutes into electrolyte solution can be prevented from becoming too large when the fractional content of copolymer having a symmetric triblock structure is not less than any of the lower limits set forth above. Another reason is that the amount of the polymer that elutes into electrolyte solution can be prevented from becoming too small when the fractional content of copolymer having a symmetric triblock structure is not more than any of the upper limits set forth above.

Note that the symmetric triblock content can be measured from the area ratio of peaks obtained by high-performance liquid chromatography (standard polystyrene-equivalent values) that correspond to various block copolymers.

Moreover, the symmetric triblock content can be adjusted by altering the type of a subsequently described coupling agent, the reaction conditions, and so forth and by altering the coupling ratio.

[[Fractional Content of Copolymer Having Asymmetric Triblock Structure]]

The proportion constituted by copolymer having an asymmetric triblock structure among the entire polymer (i.e., the asymmetric triblock content) is preferably 5 mass % or less, and more preferably 0 mass %. One reason for this is that flexibility of an electrode can be maintained when the fractional content of copolymer having an asymmetric triblock structure is not more than any of the upper limits set forth above.

Note that the asymmetric triblock content can be measured from the area ratio of peaks obtained by high-performance liquid chromatography (standard polystyrene-equivalent values) that correspond to various block copolymers.

Moreover, the asymmetric triblock content can be adjusted by altering the type of a subsequently described coupling agent, the reaction conditions, and so forth and by altering the coupling ratio.

[[Production of Block Copolymer]]

No specific limitations are placed on the method of polymerization of the block copolymer. For example, any of solution polymerization, suspension polymerization, bulk polymerization, and emulsion polymerization may be used. The polymerization reaction may be, for example, addition polymerization such as ionic polymerization, radical polymerization, or living radical polymerization. An emulsifier, dispersant, polymerization initiator, polymerization aid, or the like used in polymerization may be the same as typically used and the amount thereof may also be the same as typically used.

Moreover, the polymer used in the presently disclosed binder composition is a block copolymer and this block copolymer can be produced by any conventional method that is commonly known. Specifically, the block copolymer may be produced by, for example, polymerizing a first monomer component to obtain a solution, adding a second monomer component, differing from the first monomer component, to the solution and polymerizing the second monomer component, and then optionally repeating monomer component addition and polymerization, or may be produced by using a coupling agent to perform coupling of a produced block copolymer.

Note that from a viewpoint of producing a desired block copolymer, it is preferable that an obtained polymer solution and an aqueous solution are used to perform phase-inversion emulsification, and then separation of the emulsified product is performed.

The phase-inversion emulsification can be performed using a known emulsifying and dispersing device, for example. Moreover, the separation may be carried out using a known chromatographic column, for example. However, these are not intended to be limitations.

[[Coupling of Block Copolymer]]

A block copolymer including a structure derived from a coupling agent can be obtained by using a coupling agent to perform coupling of a block copolymer produced as described above. In general, copolymer having a diblock structure is coupled to form a symmetric triblock structure including a structure derived from the coupling agent.

—Coupling Agent—

Although no specific limitations are placed on the coupling agent, the functionality of the coupling agent is preferably 2 or higher, and is preferably 6 or lower, more preferably 5 or lower, and particularly preferably 4 or lower. One reason for this is that the amount of the polymer that elutes into electrolyte solution can be prevented from becoming too large and low-temperature output characteristics of a secondary battery including an electrode formed using the binder composition can be further improved when the coupling agent has a functionality of 2 or higher. Another reason is that the amount of the polymer that elutes into electrolyte solution can be prevented from becoming too small and low-temperature cycle characteristics of a secondary battery including the aforementioned electrode can be further improved when the coupling agent has a functionality of 6 or lower.

Examples of difunctional coupling agents include difunctional halosilanes such as dichlorosilane, monomethyldichlorosilane, and dimethyldichlorosilane (dichlorodimethylsilane (DCDMS)); difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane, ethyltrichlorosilane, and trichlorophenylsilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane (TMS) and tetraethoxysilane; and tetrafunctional tin halides such as tin tetrachloride and tin tetrabromide.

Examples of pentafunctional coupling agents include 1,1,1,2,2-pentachloroethane, pentachlorobenzene, perchloroethane, perchlorobenzene, octabromodiphenyl ether, and decabromodiphenyl ether.

Examples of hexafunctional coupling agents include hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane.

One of these coupling agents may be used individually, or two or more of these coupling agents may be used in combination.

—Coupling Ratio—

The coupling ratio of the block copolymer is preferably 20 mass % or more, more preferably 30 mass % or more, even more preferably 34 mass % or more, further preferably 40 mass % or more, even further preferably 55 mass % or more, particularly preferably 77 mass % or more, and most preferably 80 mass % or more, and is preferably 90 mass % or less, more preferably 88 mass % or less, and particularly preferably 82 mass % or less. One reason for this is that the amount of the polymer that elutes into electrolyte solution can be prevented from becoming too small and low-temperature cycle characteristics of a secondary battery including an electrode formed using the binder composition can be further improved when the coupling ratio of the block copolymer is not more than any of the upper limits set forth above. Another reason is that the amount of the polymer that elutes into electrolyte solution can be prevented from becoming too large and low-temperature output characteristics of a secondary battery including the aforementioned electrode can be further improved when the coupling ratio of the block copolymer is not less than any of the lower limits set forth above.

[[Weight-Average Molecular Weight of Block Copolymer]]

The weight-average molecular weight of the block copolymer is preferably 100,000 or more, more preferably 110,000 or more, even more preferably 120,000 or more, and particularly preferably 140,000 or more, and is preferably 500,000 or less, more preferably 250,000 or less, and particularly preferably 200,000 or less. One reason for this is that the amount of the polymer that elutes into electrolyte solution can be prevented from becoming too small and low-temperature cycle characteristics of a secondary battery including an electrode formed using the binder composition can be further improved when the weight-average molecular weight of the block copolymer is not more than any of the upper limits set forth above. Another reason is that the amount of the polymer that elutes into electrolyte solution can be prevented from becoming too large and low-temperature output characteristics of a secondary battery including the aforementioned electrode can be further improved when the weight-average molecular weight of the block copolymer is not less than any of the lower limits set forth above.

[[Amount of Block Copolymer that Elutes into Electrolyte Solution]]

The amount of the block copolymer that elutes into electrolyte solution is required to be 1.0 mass % or more, and is preferably 1.2 mass % or more, and more preferably 1.3 mass % or more. Moreover, the amount of the block copolymer that elutes into electrolyte solution is required to be 20 mass % or less, and is preferably 18 mass % or less, more preferably 16 mass % or less, even more preferably 6.2 mass % or less, further preferably 5.4 mass % or less, particularly preferably 4.6 mass % or less, and most preferably 2.5 mass % or less. One reason for this is that low-temperature output characteristics of a secondary battery including an electrode formed using the binder composition can be improved when the amount of the block copolymer that elutes into electrolyte solution is not more than any of the upper limits set forth above. Another reason is that low-temperature cycle characteristics of a secondary battery including the aforementioned electrode can be improved when the amount of the block copolymer that elutes into electrolyte solution is not less than any of the lower limits set forth above.

Note that the amount of the block copolymer that elutes into electrolyte solution is measured by a method described further below in the EXAMPLES section.

<Solvent>

The solvent contained in the presently disclosed binder composition for a non-aqueous secondary battery electrode is not specifically limited and may, for example, be water. Note that the solvent may be an aqueous solution or may be a mixed solution of water and a small amount of an organic solvent.

From a viewpoint of productivity, the amount of the solvent per 100 parts by mass of an electrode active material is preferably 30 parts by mass or more, more preferably 80 parts by mass or more, and particularly preferably 110 parts by mass or more, and is preferably 200 parts by mass or less, more preferably 150 parts by mass or less, and particularly preferably 120 parts by mass or less.

<Other Components>

Besides the components described above, the presently disclosed binder composition for a non-aqueous secondary battery electrode may contain components such as a reinforcing material, a leveling agent, another polymer as a viscosity modifier, and an additive for electrolyte solution. These other components are not specifically limited so long as they do not affect the battery reactions and may be selected from commonly known components such as those described in WO 2012/115096 A1. One of these components may be used individually, or two or more of these components may be used in combination in a freely selected ratio.

<Production of Binder Composition for Non-Aqueous Secondary Battery Electrode>

So long as a binder composition containing a solvent and a polymer that is a block copolymer including an aromatic vinyl monomer unit and an aliphatic conjugated diene monomer unit having a carbon number of 5 or more and for which the amount of the polymer that elutes into electrolyte solution is a specific amount is used, the presently disclosed binder composition for a non-aqueous secondary battery electrode can be produced by mixing the polymer and other optional components in the presence of the solvent without any specific limitations. Note that in a situation in which a dispersion liquid of the polymer is used in production of the binder composition, liquid content of this dispersion liquid may be used as the solvent of the binder composition.

(Slurry Composition for Non-Aqueous Secondary Battery Electrode)

The presently disclosed slurry composition for a non-aqueous secondary battery electrode contains an electrode active material and the presently disclosed binder composition for a non-aqueous secondary battery electrode set forth above, and may optionally further contain other components. In other words, the presently disclosed slurry composition for a non-aqueous secondary battery electrode typically contains an electrode active material, the previously described polymer, and the previously described solvent, and may optionally further contain other components.

When the presently disclosed slurry composition for a non-aqueous secondary battery electrode is used to form an electrode mixed material layer of an electrode, good binding among the electrode active material and between the electrode active material and a substrate, such as a current collector, can be achieved (high pressability can be obtained) as a result of the binder composition set forth above being contained therein. Moreover, a non-aqueous secondary battery can be caused to display excellent battery characteristics, and particularly low-temperature cycle characteristics and low-temperature output characteristics, by using an electrode formed using the presently disclosed slurry composition for a non-aqueous secondary battery electrode.

The content of the solvent in the presently disclosed slurry composition for a non-aqueous secondary battery electrode is not specifically limited but is preferably not less than 70 parts by mass and not more than 200 parts by mass per 100 parts by mass of the electrode active material from a viewpoint of dispersibility of the electrode active material.

Although the following describes, as one example, a case in which the slurry composition for a non-aqueous secondary battery electrode is a slurry composition for a lithium ion secondary battery negative electrode, the presently disclosed slurry composition for a non-aqueous secondary battery electrode is not limited to the following example.

<Electrode Active Material>

The electrode active material is a material that gives and receives electrons in an electrode of a secondary battery. The negative electrode active material of a lithium ion secondary battery is normally a material that can occlude and release lithium.

Specific examples of negative electrode active materials for lithium ion secondary batteries include carbon-based negative electrode active materials, metal-based negative electrode active materials, and negative electrode active materials formed by combining these materials.

Examples of carbonaceous materials include graphitizing carbon and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of artificial graphite include artificial graphite obtained by heat-treating carbon containing graphitizing carbon at mainly 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

A metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal;

and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

<Other Components>

Examples of other components that may be contained in the slurry composition include, but are not specifically limited to, the same other components as may be contained in the presently disclosed binder composition. It is preferable that carboxymethyl cellulose is used as another polymer (viscosity modifier) from a viewpoint of obtaining excellent coatability through thickening. Moreover, a single polymer may be used as another polymer or a blend of a plurality of polymers may be used as another polymer.

From a viewpoint of battery characteristics, the amount of another polymer per 100 parts by mass of the electrode active material is preferably 0.5 parts by mass or more, more preferably 0.7 parts by mass or more, and particularly preferably 2.0 parts by mass or more, and is preferably 4.0 parts by mass or less, more preferably 3.5 parts by mass or less, and particularly preferably 2.6 parts by mass or less.

The slurry composition may further contain a conductive material such as carbon black. One of these components may be used individually, or two or more of these components may be used in combination in a freely selected ratio.

<Production of Slurry Composition for Non-Aqueous Secondary Battery Electrode>

The slurry composition set forth above can be produced by dispersing or dissolving the above-described components in a solvent such as water. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Mixing of the above-described components and the solvent may normally be performed in a temperature range of room temperature to 80° C. for a period of 10 minutes to several hours. The solvent used in production of the slurry composition may be the same type as that of the binder composition. Moreover, the solvent used in production of the slurry composition may contain solvent that was contained in the binder composition.

The fractional content of the binder composition for a non-aqueous secondary battery electrode per 100 parts by mass of the electrode active material in the slurry composition set forth above is normally 0.1 parts by mass or more, and preferably 0.5 parts by mass or more, and is normally 5 parts by mass or less, and preferably 3 parts by mass or less.

(Electrode for Non-Aqueous Secondary Battery)

The presently disclosed electrode for a non-aqueous secondary battery includes an electrode mixed material layer formed using the slurry composition for a non-aqueous secondary battery electrode set forth above, and normally includes a substrate, such as a current collector, having the electrode mixed material layer formed thereon. The electrode mixed material layer contains at least an electrode active material and the previously described polymer. It should be noted that components contained in the electrode mixed material layer are components that were contained in the slurry composition for a non-aqueous secondary battery electrode. Furthermore, the preferred ratio of these components in the electrode mixed material layer is the same as the preferred ratio of these components in the slurry composition.

In the presently disclosed electrode for a non-aqueous secondary battery, good binding between the electrode mixed material layer and the substrate is achieved (high pressability is obtained) as a result of a slurry composition that contains the presently disclosed binder composition for a non-aqueous secondary battery electrode being used. Moreover, as a result of the presently disclosed electrode for a non-aqueous secondary battery being formed using a slurry composition that contains the presently disclosed binder composition for a non-aqueous secondary battery electrode, a secondary battery having excellent battery characteristics such as low-temperature cycle characteristics and low-temperature output characteristics can be obtained using the electrode formed using the binder composition.

<Formation of Electrode for Non-Aqueous Secondary Battery>

The presently disclosed electrode for a non-aqueous secondary battery is produced, for example, through a step of applying the slurry composition set forth above onto a substrate such as a current collector (application step) and a step of drying the slurry composition that has been applied onto the substrate to form an electrode mixed material layer on the substrate (drying step).

[Application Step]

The slurry composition can be applied onto the substrate by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the substrate. The thickness of the slurry coating on the substrate after application but before drying may be set as appropriate in accordance with the thickness of the electrode mixed material layer to be obtained after drying.

[Drying Step]

The slurry composition on the substrate may be dried by any commonly known method without any specific limitations. Examples of drying methods that can be used include drying by warm, hot, or low-humidity air; drying in a vacuum; and drying by irradiation with infrared light, electron beams, or the like. Drying of the slurry composition on the substrate in this manner forms an electrode mixed material layer on the substrate and thereby provides an electrode for a secondary battery that includes the substrate and the electrode mixed material layer.

After the drying step, the electrode mixed material layer may be further subjected to a pressing process, such as mold pressing or roll pressing. The pressing process can improve close adherence between the electrode mixed material layer and the substrate. Furthermore, in a case in which the electrode mixed material layer contains a curable polymer, the polymer is preferably cured after the electrode mixed material layer has been formed.

(Non-Aqueous Secondary Battery)

The presently disclosed non-aqueous secondary battery includes a positive electrode, a negative electrode, an electrolyte solution, and a separator, wherein the presently disclosed electrode for a non-aqueous secondary battery is used as at least one of the positive electrode and the negative electrode. The presently disclosed non-aqueous secondary battery has excellent battery characteristics such as low-temperature cycle characteristics and low-temperature output characteristics as a result of including the presently disclosed electrode for a non-aqueous secondary battery.

The presently disclosed non-aqueous secondary battery is preferably a secondary battery in which the presently disclosed electrode for a non-aqueous secondary battery is used as a negative electrode. Although the following describes, as one example, a case in which the secondary battery is a lithium ion secondary battery, the presently disclosed secondary battery is not limited to the following example.

<Electrodes>

As described above, the presently disclosed electrode for a non-aqueous secondary battery is used as at least one of the positive electrode and the negative electrode. In other words, the positive electrode of the lithium ion secondary battery may be the presently disclosed electrode and the negative electrode of the lithium ion secondary battery may be a known negative electrode other than the presently disclosed electrode. Alternatively, the negative electrode of the lithium ion secondary battery may be the presently disclosed electrode and the positive electrode of the lithium ion secondary battery may be a known positive electrode other than the presently disclosed electrode. Further alternatively, the positive electrode and the negative electrode of the lithium ion secondary battery may both be the presently disclosed electrode.

Note that when a known electrode other than the presently disclosed electrode for a non-aqueous secondary battery is used, this electrode may be an electrode that is obtained by forming an electrode mixed material layer on a substrate, such as a current collector, by a known production method.

<Electrolyte Solution>

The electrolyte solution is normally an organic electrolyte solution obtained by dissolving a supporting electrolyte in an organic solvent. The supporting electrolyte of a lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Suitable examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %. Known additives such as vinylene carbonate (VC), fluoroethylene carbonate, and ethyl methyl sulfone may be added to the electrolyte solution.

<Separator>

Examples of separators that can be used include, but are not specifically limited to, those described in JP 2012-204303 A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the "amount of elution into non-aqueous electrolyte solution", "weight-average molecular weight Mw and coupling ratio of a block copolymer", "fractional content of an aromatic vinyl monomer unit (styrene content) in a block copolymer", "mass ratio of copolymer having a symmetric triblock structure (symmetric SIS; symmetric SBS)/copolymer having an asymmetric triblock structure (asymmetric SIS; asymmetric SBS)/copolymer having a diblock structure (SI diblock structure; SB diblock structure)", "percentage hydrogenation of a block copolymer", "volume-average particle diameter of a binder composition for a non-aqueous secondary battery electrode", "pressability of an electrode", and "low-temperature cycle characteristics and low-temperature output characteristics of a secondary battery".

<Measurement of Amount of Elution into Non-Aqueous Electrolyte Solution>

A subsequently described block copolymer latex (solid content concentration: 40%) was dried in an environment having a humidity of 50% and a temperature of 23° C. to 25° C. for 3 days to obtain a film of 1±0.3 mm in thickness. A binder film of 1 cm×1 cm was cut out from this film and the mass M0 thereof was measured. The obtained film was subsequently immersed in non-aqueous electrolyte solution (solvent: ethylene carbonate (EC)/diethyl carbonate (DEC)/vinylene carbonate (VC)=68.5/30/1.5 (volume ratio); electrolyte: LiPF$_6$ of 1 M in concentration) at 60° C. for 72 hours. After immersion, non-aqueous electrolyte solution was wiped from the surface of the film and the mass M1 of the film was measured. The amount of elution into the non-aqueous electrolyte solution was calculated by the following equation (2). The result is shown in Table 1.

Amount of elution into non-aqueous electrolyte solution (mass %)=(M0−M1)/M0×100      Equation (2)

<Measurement of Weight-Average Molecular Weight Mw and Coupling Ratio of Block Copolymer>

The weight-average molecular weight and coupling ratio of a block copolymer were measured as polystyrene-equivalent molecular weights by high-performance liquid chromatography (apparatus: HLC8220 (model no.) produced by Tosoh Corporation). This measurement was performed using three connected columns (Shodex KF-404HQ (model no.) produced by Showa Denko K.K.; column temperature: 40° C.; carrier: tetrahydrofuran at flow rate of 0.35 mL/min) and using a differential refractometer and a UV detector as detectors. Molecular weight calibration was performed with 12 points for standard polystyrene (produced by Polymer Laboratories Ltd.; standard molecular weights: 500 to 3,000,000). The weight-average molecular weight Mw of the block copolymer was determined from the chart obtained by high-performance liquid chromatography and the coupling ratio (mass %) was determined from the area ratio of peaks corresponding to various block copolymers. The results are shown in Table 1.

<Measurement of Fractional Content of Aromatic Vinyl Monomer Unit (Styrene Content) in Block Copolymer>

A measurement sample was prepared by coagulating a water dispersion of a block copolymer in methanol, and then performing vacuum drying at a temperature of 100° C. for 5 hours. The proportion (mass %) in which an aromatic vinyl monomer unit was included in the measurement sample was measured by $^1$H-NMR. The measured value is shown in Table 1.

<Measurement of Mass Ratio of Copolymer Having Symmetric Triblock Structure (Symmetric SIS; Symmetric SBS)/Copolymer Having Asymmetric Triblock Structure (Asymmetric SIS; Asymmetric SBS)/Copolymer Having Diblock Structure (SI Diblock Structure; SB Diblock Structure)>

The mass ratio of copolymer having a symmetric triblock structure (symmetric SIS; symmetric SBS), copolymer having an asymmetric triblock structure (asymmetric SIS; asymmetric SBS), and copolymer having a diblock structure (SI diblock structure; SB diblock structure) was determined from the area ratio of peaks corresponding to the various block copolymers in the chart obtained by high-performance liquid chromatography described above. The result is shown in Table 1.

<Measurement of Percentage Hydrogenation of Block Copolymer>

The percentage hydrogenation of a block copolymer was calculated by measuring a $^1$H-NMR spectrum both before and after a hydrogenation reaction, and then calculating the percentage hydrogenation based on the amount of decrease of integrated values for signals corresponding to unsaturated bonds of main chains and side chain portions and unsaturated bonds of aromatic rings between before and after the hydrogenation reaction. The result is shown in Table 1.

<Measurement of Volume-Average Particle Diameter of Binder Composition for Non-Aqueous Secondary Battery Electrode after Phase-Inversion Emulsification>

The volume-average particle diameter (D50) of a binder composition for a non-aqueous secondary battery electrode after phase-inversion emulsification was measured using a laser diffraction particle diameter distribution analyzer (LS-230 (product name) produced by Beckman Coulter, Inc.). Specifically, a water dispersion of a block copolymer was measured using the apparatus indicated above and then the volume-average particle diameter was determined as the particle diameter (μm) at which, in the obtained particle size distribution (volume basis), cumulative volume calculated from the small diameter end of the distribution reached 50%. The measured value is shown in Table 1.

<Evaluation of Pressability of Electrode>

A test specimen of 100 mm×100 mm was cut out from a negative electrode web before a pressing step. The test specimen was pressed at 12 MPa for 30 seconds. The density of the post-pressing negative electrode mixed material layer was calculated and was evaluated by the following standard. A higher post-pressing negative electrode mixed material layer density indicates that the pre-pressing negative electrode mixed material layer has better pressability. Note that when carrying out this evaluation in the examples and comparative examples, the "density" of a negative electrode mixed material layer was calculated using the mass of the negative electrode mixed material layer per unit area and the thickness of the negative electrode mixed material layer.

A: Post-pressing negative electrode mixed material layer density of 1.60 g/cm$^3$ or more B: Post-pressing negative electrode mixed material layer density of not less than 1.57 g/cm$^3$ and less than 1.60 g/cm$^3$ C: Post-pressing negative electrode mixed material layer density of not less than 1.54 g/cm$^3$ and less than 1.57 g/cm$^3$ D: Post-pressing negative electrode mixed material layer density of less than 1.54 g/cm$^3$ <Evaluation of Low-Temperature Cycle Characteristics>

A lithium ion secondary battery of a laminate-type cell that was produced in each example or comparative example was left at rest in a 25° C. environment for 24 hours and was subsequently subjected to a charge/discharge operation of charging to 4.35 V at a charge rate of 1 C and discharging to 3.0 V at a discharge rate of 1 C in a 25° C. environment. The initial capacity C0 was measured. Thereafter, the lithium ion secondary battery was repeatedly subjected to the same charge/discharge operation in a 0° C. environment and the capacity C1 after 300 cycles was measured. The capacity maintenance rate was evaluated using a capacity maintenance rate ΔC expressed by ΔC=(C1/C0)×100(%). A higher capacity maintenance rate ΔC indicates better low-temperature characteristics. The result is shown in Table 1.

A: Capacity maintenance rate ΔC of 50% or more

B: Capacity maintenance rate ΔC of not less than 40% and less than 50%

C: Capacity maintenance rate ΔC of less than 40%

<Evaluation of Low-Temperature Output Characteristics>

A lithium ion secondary battery of a laminate-type cell produced in each example or comparative example was left at rest in a 25° C. environment for 24 hours and was then charged under conditions of CC-CV charging (0.02 C cut-off) to 4.35 V at 0.2 C in a 25° C. environment. The lithium ion secondary battery was subsequently CC discharged to 3.0 V at 0.2 C. The discharge capacity at this time was taken to be the initial capacity. Next, the lithium ion secondary battery was charged to 50% of the initial capacity and the voltage at this time was taken to be V0. Thereafter, the lithium ion secondary battery was discharged at a discharge rate of 1 C in a −10° C. environment, and the voltage V1 at 0.1 seconds after the start of discharge was measured. Low-temperature output characteristics were evaluated by the voltage change ΔV expressed by ΔV=V0−V1. A smaller value for the voltage change ΔV indicates better low-temperature characteristics. The result is shown in Table 1.

A: Voltage change ΔV of less than 1.0 V

B: Voltage change ΔV of not less than 1.0 V and less than 1.1 V

C: Voltage change ΔV of 1.1 V or more

Example 1

<Production of Block Copolymer>

A pressure-resistant reactor was charged with 233.3 kg of cyclohexane, 60.0 mmol of N,N,N',N'-tetramethylethylenediamine (hereinafter, referred to as TMEDA), and 24.0 kg of styrene. These materials were stirred at 40° C. while 2000.0 mmol of n-butyllithium was added thereto and were then heated to 50° C. while polymerization was carried out for 1 hour. The polymerization conversion rate of styrene was 100%. Next, temperature control was performed to maintain a temperature of 50° C. to 60° C. while continuously adding 76.0 kg of isoprene into the reactor over 1 hour. The polymerization reaction was continued for 1 hour after completing addition of the isoprene. The polymerization conversion rate of isoprene was 100%. Next, 820.0 mmol of dichlorodimethylsilane (DCDMS) as a coupling agent was added and a coupling reaction was performed for 2 hours to form a styrene-isoprene coupled block copolymer. Thereafter, 4000.0 mmol of methanol was added to the reaction liquid in which styrene-isoprene block copolymer having active terminals was thought to remain and was thoroughly mixed therewith to deactivate active terminals. Next, 0.3 parts of 2,6-di-tert-butyl-p-cresol as an antioxidant was added to 100 parts of the reaction liquid obtained as described above (containing 30.0 parts of polymer component) and was mixed therewith to obtain a block copolymer solution.

Moreover, the obtained block copolymer was used to perform "measurement of the weight-average molecular weight Mw and coupling ratio", "measurement of the fractional content of an aromatic vinyl monomer unit (styrene content) in the block copolymer", "measurement of the mass ratio of copolymer having a symmetric triblock structure (symmetric SIS)/copolymer having an asymmetric triblock structure (asymmetric SIS)/copolymer having a diblock structure (SI diblock structure)", and "measurement of the percentage hydrogenation of the block copolymer". The results are shown in Table 1.

<Production of Binder Composition for Non-Aqueous Secondary Battery Electrode>

Sodium linear alkylbenzene sulfonate was dissolved in deionized water to produce an aqueous solution having a total solid content of 2 mass %.

A tank was charged with 500 g of the obtained block copolymer solution and 500 g of the obtained aqueous solution having a total solid content of 2 mass %, and preliminary mixing of these materials was performed by stirring. Next, a metering pump was used to transfer the preliminary mixture from the tank to a continuous high-performance emulsifying and dispersing device (Milder MDN303V (produced name) produced by Pacific Machinery & Engineering Co., Ltd.) at a rate of 100 g/min, and the preliminary mixture was stirred at a rotation speed of 20,000 rpm to cause phase-inversion emulsification of the preliminary mixture and obtain an emulsion.

Cyclohexane in the obtained emulsion was subsequently evaporated under reduced pressure in a rotary evaporator. The emulsion resulting from this evaporation was left to separate for 1 day in a chromatographic column equipped with a stop-cock, and a lower layer portion was removed after separation to perform concentration.

Finally, an upper layer portion was filtered through a 100-mesh screen to obtain a latex (solid content concentration: 40%) of a block copolymer including a styrene region and an isoprene region.

The obtained block copolymer latex (solid content concentration: 40%) was used for "measurement of the amount of elution into non-aqueous electrolyte solution". The result is shown in Table 1.

<Production of Slurry Composition for Non-Aqueous Secondary Battery Electrode (Negative Electrode)>

A mixture was obtained by loading 70 parts of artificial graphite (MAG-E (product name) produced by Hitachi Chemical Co., Ltd.) and 25.6 parts of natural graphite (604A (product name) produced by Nippon Carbon Co., Ltd.) as negative electrode active materials, 1 part of carbon black (Super C65 (product name) produced by TIMCAL) as a conductive material, and 1.2 parts in terms of solid content of a 2% aqueous solution of carboxymethyl cellulose (MAC-350HC (product name) produced by Nippon Paper Industries Co., Ltd.) as a thickener into a planetary mixer equipped with a disper blade. The resultant mixture was adjusted to a solid content concentration of 60% with deionized water and was subsequently mixed at 25° C. for 60 minutes. Next, the mixture was adjusted to a solid content concentration of 52% with deionized water and was then mixed at 25° C. for a further 15 minutes to obtain a mixed liquid. Deionized water and 2.2 parts in terms of solid content of the binder composition for a non-aqueous secondary battery electrode produced as described above were added to the obtained mixed liquid such that the final solid content concentration was adjusted to 48%. (Note that in this case, "Amount of solvent per 100 parts by mass of active material" in Table 1 is 113 parts by mass and "Amount of other polymer per 100 parts by mass of active material" in Table 1 is 2.3 parts by mass.) Further mixing was performed for 10 minutes and then a defoaming process was carried out under reduced pressure to yield a slurry composition for a non-aqueous secondary battery electrode (negative electrode) having good fluidity.

<Formation of Negative Electrode>

The obtained slurry composition for a non-aqueous secondary battery negative electrode was applied onto copper foil (current collector) of 20 μm in thickness using a comma coater such as to have a thickness of approximately 150 μm after drying. The applied slurry composition was dried by conveying the copper foil inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode having a negative electrode mixed material layer thickness of 80 μm.

The obtained negative electrode was used to perform "evaluation of pressability". The result is shown in Table 1.

<Formation of Positive Electrode>

A slurry composition for a non-aqueous secondary battery positive electrode was obtained by combining 100 parts of $LiCoO_2$ having a volume-average particle diameter of 12 μm as a positive electrode active material, 2 parts of acetylene black (HS-100 (product name) produced by Denki Kagaku Kogyo Kabushiki Kaisha) as a conductive material, 2 parts in terms of solid content of polyvinylidene fluoride (#7208 (product name) produced by Kureha Corporation) as a binder, and N-methylpyrrolidone as a solvent such as to have a total solid content concentration of 70% and mixing these materials using a planetary mixer.

The obtained slurry composition for a non-aqueous secondary battery positive electrode was applied onto aluminum foil (current collector) of 20 μm in thickness using a comma coater such as to have a thickness of approximately 150 μm after drying. The applied slurry composition was dried by conveying the aluminum foil inside a 60° C. oven for 2 minutes at a speed of 0.5 m/min. Thereafter, heat treatment was performed for 2 minutes at 120° C. to obtain a positive electrode web.

The resultant positive electrode web was rolled by a roll press to obtain a positive electrode including a positive electrode mixed material layer.

<Preparation of Separator>

A separator made from a single layer of polypropylene (Celgard 2500 (product name) produced by Celgard, LLC.) was used as a separator.

<Production of Non-Aqueous Secondary Battery>

A rectangle of 49 cm×5 cm was cut out from the obtained post-pressing positive electrode and was placed with the surface at the positive electrode mixed material layer side of the positive electrode on top. A separator that had been cut out to 120 cm×5.5 cm was placed on the positive electrode mixed material layer such that the positive electrode was positioned at the longitudinal direction left-hand side of the separator. In addition, a rectangle of 50 cm×5.2 cm was cut out from the obtained post-pressing negative electrode and was placed on the separator such that the surface at the negative electrode mixed material layer side of the negative electrode faced toward the separator and such that the negative electrode was positioned at the longitudinal direction right-hand side of the separator. The resultant laminate was wound by a winding machine to obtain a roll. The roll was enclosed in an aluminum packing case serving as a battery case, electrolyte solution (solvent: ethylene carbonate (EC)/diethyl carbonate (DEC)/vinylene carbonate (VC)= 68.5/30/1.5 (volume ratio); electrolyte: $LiPF_6$ of 1 M in concentration) was injected such that no air remained, and then an opening of the aluminum packing case was closed by heat sealing at 150° C. to produce a wound-type lithium ion secondary battery having a capacity of 800 mAh.

The low-temperature cycle characteristics and low-temperature output characteristics of the produced lithium ion secondary battery were evaluated. The results are shown in Table 1.

Example 2

A separator was prepared and a block copolymer, a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that the additive amount of TMEDA was set as 40.0 mmol, the additive amount of styrene was set as 19.0 kg, the additive amount of n-butyllithium was set as 1333.3 mmol, the additive amount of isoprene was set as 81.0 kg, the additive amount of dichlorodimethylsilane was set as 533.3 mmol, and the additive amount of methanol was set as 2666.7 mmol. Measurements and evaluations were also carried out in the same way as in Example 1. The results are shown in Table 1.

Example 3

A separator was prepared and a block copolymer, a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that the additive amount of TMEDA was set as 57.5 mmol, the additive amount of styrene was set as 30.0 kg, the additive amount of n-butyllithium was set as 1917.8 mmol, the additive amount of isoprene was set as 70.0 kg, the additive amount of dichlorodimethylsilane was set as 527.4 mmol, and the additive amount of methanol was set as 3835.6 mmol. Measurements and evaluations were also carried out in the same way as in Example 1. The results are shown in Table 1.

Example 4

A separator was prepared and a block copolymer, a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that the additive amount of TMEDA was set as 91.3 mmol, the additive amount of styrene was set as 18.0 kg, the additive amount of n-butyllithium was set as 3043.5 mmol, the additive amount of isoprene was set as 82.0 kg, 821.7 mmol of divinyldimethylsilane and 200.0 mmol of tetramethoxysilane (TMS) were added instead of 820.0 mmol of dichlorodimethylsilane, and the additive amount of methanol was set as 6087.0 mmol. Measurements and evaluations were also carried out in the same way as in Example 1. The results are shown in Table 1.

Example 5

A separator was prepared and a block copolymer, a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that the additive amount of TMEDA was set as 66.7 mmol, the additive amount of styrene was set as 23.0 kg, the additive amount of n-butyllithium was set as 2222.2 mmol, the additive amount of isoprene was set as 77.0 kg, the additive amount of dichlorodimethylsilane was set as 377.8 mmol, and the additive amount of methanol was set as 4444.4 mmol. Measurements and evaluations were also carried out in the same way as in Example 1. The results are shown in Table 1.

Example 6

A separator was prepared and a block copolymer, a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that the slurry composition for a non-aqueous secondary battery electrode (negative electrode) was produced using a mixture of silicon monoxide and natural graphite (604A (product name) produced by Nippon Carbon Co., Ltd.) in a mass ratio of 1/9 as a negative electrode active material instead of producing a slurry composition for a non-aqueous secondary battery electrode (negative electrode) using 70 parts of artificial graphite and 25.6 parts of natural graphite as negative electrode active materials as in Example 1. Measurements and evaluations were also carried out in the same way as in Example 1. The results are shown in Table 2.

Comparative Example 1

A separator was prepared and a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that a block copolymer was produced as described below. Measurements and evaluations were also carried out in the same way as in Example 1. The results are shown in Table 1.

<Production of Block Copolymer>

A reactor that was equipped with a stirrer and had been sufficiently internally purged with nitrogen was charged with 10 parts of dehydrated styrene, 550 parts of dehydrated cyclohexane, and 0.475 parts of n-butyl ether, and stirring was started at 60° C. The mixture was stirred while 0.485 parts of n-butyllithium (15% cyclohexane solution) as a polymerization initiator was added to initiate polymerization and was further stirred while a reaction was carried out at 60° C. for 1 hour. The polymerization conversion rate at this point was 99.5%. Note that the polymerization conversion rate was measured by gas chromatography (6850N (model no.) produced by Agilent Technologies, Inc.). The same applies below.

Next, 85 parts of dehydrated isoprene as an aliphatic conjugated diene monomer was added into the reactor and stirring was continued at 60° C. for 30 minutes to continue polymerization. The polymerization conversion rate at this point was 99%.

Next, 0.5 parts of dimethyldichlorosilane as a coupling agent was added and a coupling reaction was performed for 2 hours to yield a styrene-isoprene diblock copolymer solution.

In addition, 5 parts of dehydrated styrene as an aromatic vinyl monomer was added and was stirred therewith at 60° C. for 60 minutes to perform polymerization. The polymerization conversion rate at this point was almost 100%.

Next, 0.5 parts of isopropyl alcohol was added to the polymerization reaction liquid to terminate the reaction and yield a block copolymer solution.

Comparative Example 2

A separator was prepared and a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that a block copolymer produced as described below was used. Measurements and evaluations were also carried out in the same way as in Example 1. The results are shown in Table 1.

<Production of Block Copolymer>

A reactor that was equipped with a stirrer and had been sufficiently internally purged with nitrogen was charged with 550 parts of dehydrated cyclohexane, 20.0 parts of dehydrated styrene, and 0.475 parts of n-dibutyl ether. These materials were stirred at 60° C. while 0.215 parts of n-butyllithium (15% cyclohexane solution) was added to initiate polymerization and were further stirred while a reaction was carried out at 60° C. for 60 minutes. The polymerization conversion rate at this point was 99.5%. Next, 60.0 parts of dehydrated isoprene was added and stirring was continued at the same temperature for 30 minutes. The polymerization conversion rate at this point was 99%. Thereafter, 20.0 parts of dehydrated styrene was added and was stirred therewith at the same temperature for 60 minutes. The polymerization conversion rate at this point was almost 100%. Next, 0.5 parts of isopropyl alcohol was added to the reaction liquid to terminate the reaction and yield a solution (polymer solution) containing a block copolymer (a).

The polymer solution was subsequently transferred to a pressure-resistant reactor including a stirrer, and 4.0 parts of silica-alumina-supported nickel catalyst (E22U produced by JGC Corporation; supported amount of nickel: 60%) as a hydrogenation catalyst and 100 parts of dehydrated cyclohexane were added to the polymer solution and were mixed therewith. The inside of the reactor was purged with hydrogen gas, and the solution was stirred while hydrogen was supplied and a hydrogenation reaction was carried out at a temperature of 170° C. and a pressure of 4.5 MPa for 6 hours.

After completion of this hydrogenation reaction, the reaction solution was filtered to remove the hydrogenation catalyst. Next, filtration was performed using a Zeta Plus® (Zeta Plus is a registered trademark in Japan, other countries, or both) filter 30H (produced by CUNO Inc.; pore diameter: 0.5 μm to 1 μm) and a separate metal fiber filter (produced by Nichidai Corporation; pore diameter: 0.4 μm), in order, so as to remove fine solid content, and subsequently obtain a hydrogenated block copolymer solution.

Comparative Example 3

A separator was prepared and a block copolymer, a binder composition for a non-aqueous secondary battery electrode, a slurry composition for a non-aqueous secondary battery electrode (negative electrode), a negative electrode, a positive electrode, and a non-aqueous secondary battery were produced in the same way as in Example 1 with the exception that the additive amount of TMEDA was set as 102.1 mmol, the additive amount of styrene was set as 29.0 kg, the additive amount of n-butyllithium was set as 3404.3 mmol, 71.0 kg of butadiene was added instead of 76.0 kg of isoprene, 418.2 mmol of tetramethoxysilane (TMS) was added instead of 820.0 mmol of dichlorodimethylsilane (DCDMS), and the additive amount of methanol was set as 6808.5 mmol. Measurements and evaluations were also carried out in the same way as in Example 1. The results are shown in Table 1.

TABLE 1

|  | Example 1 | Example 2 | Example 3 | Example 4 | Example 5 |
| --- | --- | --- | --- | --- | --- |
| Block copolymer | Styrene Isoprene | Styrene Isoprene | Styrene Isoprene | Styrene Isoprene | Styrene Isoprene |
| Amount of elution into non-aqueous electrolyte solution (mass %) | 2.5 | 1.3 | 4.6 | 5.4 | 6.2 |
| Weight-average molecular weight Mw of block copolymer | 140,000 | 200,000 | 140,000 | 110,000 | 120,000 |
| Fractional content of aromatic vinyl monomer unit | 24 | 19 | 30 | 18 | 23 |

TABLE 1-continued

| | | | | | |
|---|---|---|---|---|---|
| (styrene content) in block copolymer (mass %) | | | | | |
| Coupling ratio of block copolymer (%) | 82 | 80 | 55 | 77 | 34 |
| Coupling agent | DCDMS (difunctional) | DCDMS (difunctional) | DCDMS (difunctional) | DVDMS (difunctional)/ TMS (tetrafunctional) = 7/3 | DCDMS (difunctional) |
| Mass ratio (symmetric triblock structure/asymmetric triblock structure/ diblock structure) | Symmetric SIS/ Asymmetric SIS/ SI diblock structure = 82/0/18 | Symmetric SIS/ Asymmetric SIS/ SI diblock structure = 80/0/20 | Symmetric SIS/ Asymmetric SIS/ SI diblock structure = 55/0/45 | Symmetric SIS/ Asymmetric SIS/ SI diblock structure = 77/0/23 | Symmetric SIS/ Asymmetric SIS/ SI diblock structure = 34/0/66 |
| Percentage hydrogenation of block copolymer (%) | 0 | 0 | 0 | 0 | 0 |
| Volume-average particle diameter of binder composition for non-aqueous secondary battery electrode after phase-inversion emulsification (μm) | 2.4 | 2.3 | 2.1 | 2.3 | 2.1 |
| Electrode active material | Graphite (C) | Graphite (C) | Graphite (C) | Graphite (C) | Graphite (C) |
| Amount of solvent per 100 parts by mass of active material (parts by mass) | 113 | 113 | 113 | 113 | 113 |
| Amount of other polymer per 100 parts by mass of active material (parts by mass) | 2.3 | 2.3 | 2.3 | 2.3 | 2.3 |
| Pressability of electrode | A | A | A | A | A |
| Low-temperature cycle characteristics of secondary battery | A | A | A | B | A |
| Low-temperature output characteristics of secondary battery | A | A | B | A | B |

| | Example 6 | Comparative Example 1 | Comparative Example 2 | Comparative Example 3 |
|---|---|---|---|---|
| Block copolymer | Styrene Isoprene | Styrene Isoprene | Styrene Isoprene | Styrene Butadiene |
| Amount of elution into non-aqueous electrolyte solution (mass %) | 2.5 | 0.6 | 21 | 23 |
| Weight-average molecular weight Mw of block copolymer | 140,000 | 190,000 | 180,000 | 165,000 |
| Fractional content of aromatic vinyl monomer unit (styrene content) in block copolymer (mass %) | 24 | 15 | 40 | 29 |
| Coupling ratio of block copolymer (%) | 82 | 78 | — | 43 |
| Coupling agent | DCDMS (difunctional) | DCDMS (difunctional) | — | TMS (tetrafunctional) |
| Mass ratio (symmetric triblock structure/asymmetric triblock structure/ diblock structure) | Symmetric SIS/ Asymmetric SIS/ SI diblock structure = 82/0/18 | Symmetric SIS/ Asymmetric SIS/ SI diblock structure = 78/22/0 | Symmetric SIS/ Asymmetric SIS/ SI diblock structure = 100/0/0 | Symmetric SBS/ Asymmetric SB/ SB diblock structure = 43/0/57 |
| Percentage | 0 | 0 | 99.9 | 0 |

TABLE 1-continued

| | | | | |
|---|---|---|---|---|
| hydrogenation of block copolymer (%) | | | | |
| Volume-average particle diameter of binder composition for non-aqueous secondary battery electrode after phase-inversion emulsification (μm) | 2.4 | — | — | — |
| Electrode active material | Mixture of silicon monoxide (SiO) and graphite (C) in mass ratio of 1/9 | Graphite (C) | Graphite (C) | Graphite (C) |
| Amount of solvent per 100 parts by mass of active material (parts by mass) | 113 | 113 | 113 | 113 |
| Amount of other polymer per 100 parts by mass of active material (parts by mass) | 2.3 | 2.3 | 2.3 | 2.3 |
| Pressability of electrode | A | C | C | B |
| Low-temperature cycle characteristics of secondary battery | A | C | C | C |
| Low-temperature output characteristics of secondary battery | A | C | C | C |

It can be seen from Table 1 that in Examples 1 to 6 in which the binder composition for a non-aqueous secondary battery electrode that was used contained a block copolymer that included an aromatic vinyl monomer unit and an aliphatic conjugated diene monomer unit having a carbon number of 5 or more and that had an amount of elution into electrolyte solution of not less than 1 mass % and not more than 20 mass %, a non-aqueous secondary battery including an electrode for a non-aqueous secondary battery had excellent low-temperature cycle characteristics and low-temperature output characteristics compared to in Comparative Examples 1 to 3 in which a binder composition that did not contain such a block copolymer was used.

INDUSTRIAL APPLICABILITY

According to the present disclosure, it is possible to provide a binder composition for a non-aqueous secondary battery electrode and a slurry composition for a non-aqueous secondary battery electrode that are capable of forming an electrode for a non-aqueous secondary battery that can cause a non-aqueous secondary battery to display excellent low-temperature cycle characteristics and low-temperature output characteristics.

Moreover, according to the present disclosure it is possible to provide an electrode for a non-aqueous secondary battery that can cause a non-aqueous secondary battery to display excellent low-temperature cycle characteristics and low-temperature output characteristics.

Furthermore, according to the present disclosure, it is possible to provide a non-aqueous secondary battery having excellent battery characteristics such as low-temperature cycle characteristics and low-temperature output characteristics.

The invention claimed is:

1. A binder composition for a non-aqueous secondary battery electrode comprising a polymer and a solvent, wherein
   the polymer is a block copolymer including an aromatic vinyl monomer unit and an aliphatic conjugated diene monomer unit having a carbon number of 5 or more,
   a structure of the block copolymer constituting the polymer includes a diblock structure,
   a proportion constituted by the block copolymer having the diblock structure among the entire polymer is 10 mass % or more and 20 mass % or less,
   a proportion constituted by the aliphatic conjugated diene monomer unit having the carbon number of 5 or more in the polymer when an amount of all monomer units in the polymer is taken to be 100 mass % is 70 mass % or more and 84 mass % or less,
   the structure of the block copolymer constituting the polymer further includes a symmetric triblock structure,
   a proportion constituted by copolymer having the symmetric triblock structure among the entire polymer is 80 mass % or more and 90 mass % or less, and
   the binder composition for non-aqueous secondary battery electrode is a latex of the block copolymer.

2. The binder composition for a non-aqueous secondary battery electrode according to claim 1, wherein the polymer has a coupling ratio of not less than 20 mass % and not more than 90 mass %.

3. The binder composition for a non-aqueous secondary battery electrode according to claim 1, wherein a coupling agent for obtaining the symmetric triblock structure has a functionality of not lower than 2 and not higher than 6.

4. The binder composition for a non-aqueous secondary battery electrode according to claim 1, wherein the polymer includes the aromatic vinyl monomer unit in a proportion of not less than 16 mass % and not more than 30 mass %.

5. A slurry composition for a non-aqueous secondary battery electrode comprising:
   an electrode active material; and
   the binder composition for a non-aqueous secondary battery electrode according to claim 1.

6. An electrode for a non-aqueous secondary battery comprising an electrode mixed material layer formed using the slurry composition for a non-aqueous secondary battery electrode according to claim 5.

7. A non-aqueous secondary battery comprising a positive electrode, a negative electrode, an electrolyte solution, and a separator, wherein
   at least one of the positive electrode and the negative electrode is the electrode for a non-aqueous secondary battery according to claim 6, and
   an amount of the polymer that elutes into the electrolyte solution is not less than 1 mass % and not more than 20 mass %.

8. The non-aqueous secondary battery according to claim 7, wherein the amount of the polymer that elutes into the electrolyte solution is 1.2 mass % or more and 2.5 mass % or less.

9. The binder composition for a non-aqueous secondary battery according to claim 1, wherein the weight-average molecular weight of the block copolymer is 100,000 or more and 200,000 or less.

* * * * *